Figure 1:
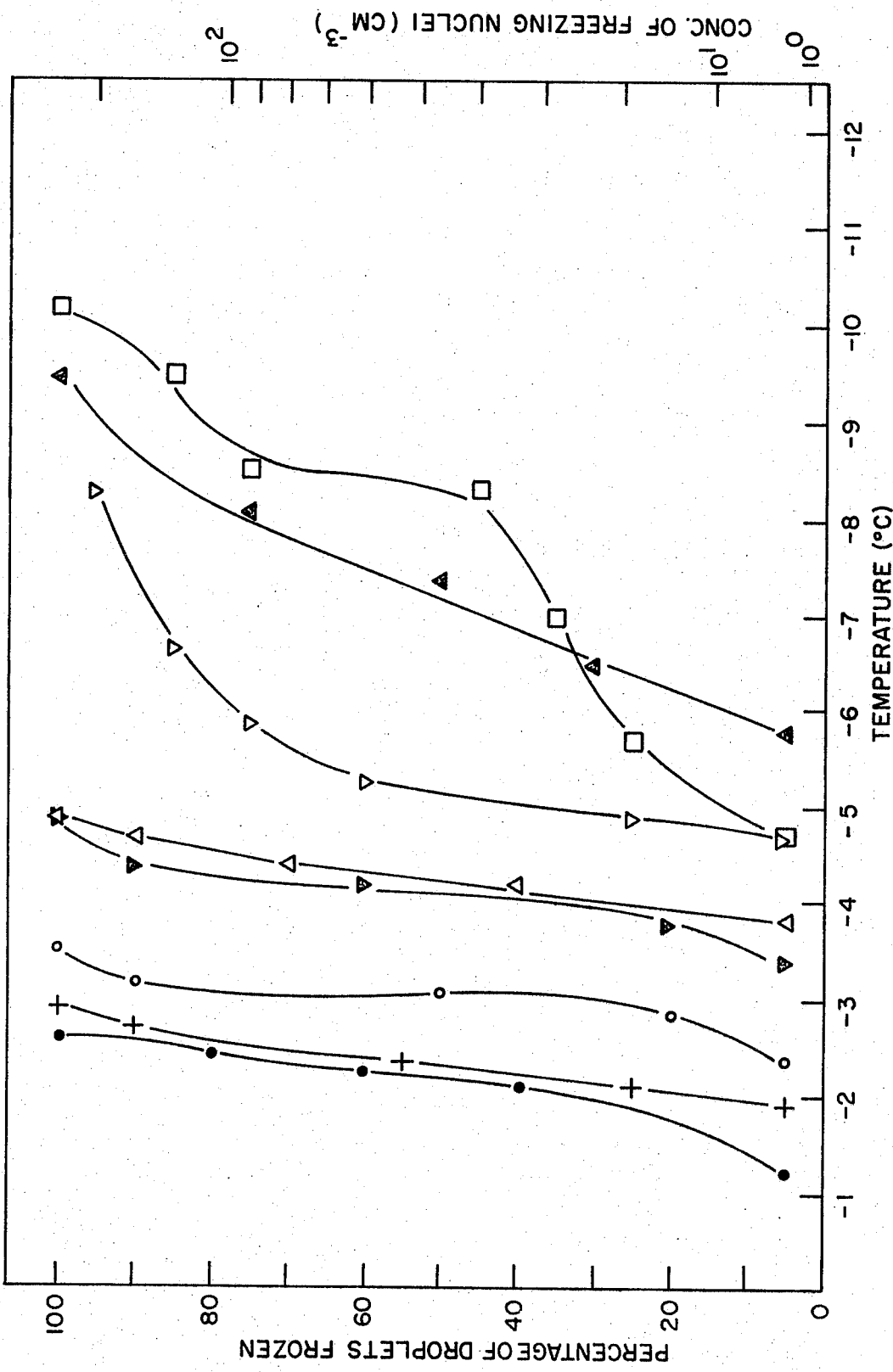

United States Patent [19]
Shen et al.

[11] 3,858,805
[45] Jan. 7, 1975

[54] ICE NUCLEATION BY MICAS

[75] Inventors: Josephine H. Shen; Kamil Klier; Albert C. Zettlemoyer, all of Bethlehem, Pa.

[73] Assignee: Lehigh University, Bethlehem, Pa.

[22] Filed: Oct. 31, 1973

[21] Appl. No.: 411,438

[52] U.S. Cl. .............................................. 239/2 R
[51] Int. Cl. ........................................... A01g 15/00
[58] Field of Search .......................... 239/2 R; 62/66

[56] References Cited
UNITED STATES PATENTS

| | | | |
|---|---|---|---|
| 3,284,005 | 11/1966 | Kasemir et al. | 239/2 R |
| 3,378,201 | 4/1968 | Glew et al. | 239/2 R |
| 3,595,477 | 7/1971 | Wollin et al. | 239/2 R |
| 3,748,278 | 7/1973 | Kuhne et al. | 239/2 R |

*Primary Examiner*—Lloyd L. King
*Attorney, Agent, or Firm*—Jackson, Jackson & Chovanes

[57] ABSTRACT

An ice nucleant or process of ice nucleation which essentially uses fluorophlogopite mica directly or has fluorine atoms at the surface replacing the OH groups in the surface of other micas.

2 Claims, 2 Drawing Figures

ICE NUCLEATION BY MICAS

DISCLOSURE OF INVENTION

Our invention consists of cloud seeding or nucleation of ice from supersaturated water by finely divided fluorophlogopite mica or the process of nucleating by such micas.

The invention relates to a process of nucleating ice and the like which involves seeding a cloud with particles in the range between 0.01 and 10 micrometers of a synthetic fluorophlogopite mica in which the fluorine atoms may be partially replaced by hydroxyl groups to form a composition of $K_2 Mg_6 Al_2 Si_6 O_{20} F_{4-x} (OH)_x$, where $x$ is a numeral which ranges between 0 and 2. When $x$ is 0, then the fluorophlogopite mica has a composition $K_2 Mg_6 Al_2 Si_6 O_{20} F_4$.

The results on the freezing nucleation temperatures for a variety of nucleants are presented in Table 1.

ing was monitored by thermistors immersed in water and attached to a recorder as a temperature jump accompanying the release of latent heat of solidification and by simultaneous visual observation of the emerging ice crystals. Both methods of detection were reproduced from sample to sample to within $\pm 0.2°C$. Samples 1 and 3 were fluorophlogopites prepared pared by Mykroy Ceramics, Inc., Ledgewood, New Jersey, with a platelet diameter of the order of 74 micrometers (F-phlogopite 200 mesh per linear inch) and 44 micrometers (F-phlogopite 325 mesh per linear inch). The BET surface area (Ar, 0.166 $nm^2$ per molecule) of fluorophlogopite of 200 mesh per linear inch is 1.0 $m^2$ per gram and the fluorophlogopite of 325 mesh per linear inch is 2.65 $m^2$ per gram. The smaller area sample has a slightly lower nucleating temperature than silver iodide and the larger area sample surpasses the activity of silver iodide. The freezing mode for both fluorophlogo- Table 1

| Sample No. | Freezing Nucleation Temperatures Substance | Average Threshold Temp. in °C |
|---|---|---|
| 1 | Fluorophlogopite mica of a size through 325 mesh per linear inch | −1.0 |
| 2 | Silver iodide | −1.5 |
| 3 | Fluorophlogopite mica of 200 mesh per linear inch | −2.0 |
| 4 | Fluorophlogopite mica, aluminum exchanged at a concentration of $10^{-2}M$, 200 mesh per linear inch in size | −3.5 |
| 5 | Finely divided phosphorus doped silica heated to 650°C** | −3.8 |
| 6 | Finely divided sodium doped silica heated at 650°C* | −4.1 |
| 7 | Aluminum exchanged fluorophlogopite mica in concentration of $10^{-3}M$ and size of 200 mesh per linear inch | −4.5 |
| 8 | Aluminum exchanged fluorophologopite mica at 0.5M concentration and through 325 mesh per linear inch | −4.7 |
| 9 | Cobalt exchanged fluorophlogopite mica at a concentration of 2M and a size of 325 mesh per linear inch | −4.9 |
| 10 | Finely divided muscovite, wet ground, washed and dried at 60°C through 325 mesh per linear inch | −5.1 |
| 11 | Finely divided silica heat treated at 800°C* | −5.1 |
| 12 | Finely divided silica heat treated at 700°C* | −5.3 |
| 13 | Finely divided phosphorus doped silica heat treated at 800°C** | −6.7 |
| 14 | Finely divided phosphorus doped silica heat treated at 500°C** | −7.3 |
| 15 | Finely divided 4 A Zeolite | −9.2 |
| 16 | Finely divided aluminum and phosphorus doped silica** | −10.2 |
| 17 | Blank | −11.3 |

**Prepared according to Bassett, Boucher and Zettlemoyer, Journal of Colloid Interface Science, 34, 436 (1970).
**Prepared according to French patent 1,352,354 (1964).

The ion exchange of fluorophlogopite was done in chloride solution at various cation concentrations at 25°–75°C. Mainly, only the surface ions were exchanged.

Freezing nucleation was performed according to the method of B. Vonnegut and H. Chessin, Science, 174, 945 (1971), consisting of observations of bulk freezing in test tubes containing water and the catalyst particles. A constant cooling rate of 0.05°C per minute was applied. The freezing temperature was determined not to be greatly dependent on the cooling rate or on the number of catalyst particles. The occurrence of freezpite and silver iodide appears to be platelet striations emanating from the catalyst particles.

In the drawings FIG. 1 is a series of curves of percentage of droplets frozen or concentration of freezing nuclei against supercooling temperatures in °C. Nucleants include (325) F-phlogopite which is marked with a solid circle ●, AgI which is marked with a cross +, (200) F-phlogopite which is marked with an open circle ○, P-$SiO_2$ (650) which is marked with a solid triangle ▼, Na-HiSil (650) which is marked with an open triangle △, P-$SiO_2$ (500) which is marked with an open triangle pointing down ▽, $10^{-3}M$ Al-F-phlogopite which is marked with an open square □ and HiSil (700) which is marked with a solid triangle ▲. The right hand scale represents the number of freezing nuclei per cubic centimeters according to G. Vali, J. Atmos. Science, 28, 402 (1971).

Figure 2:
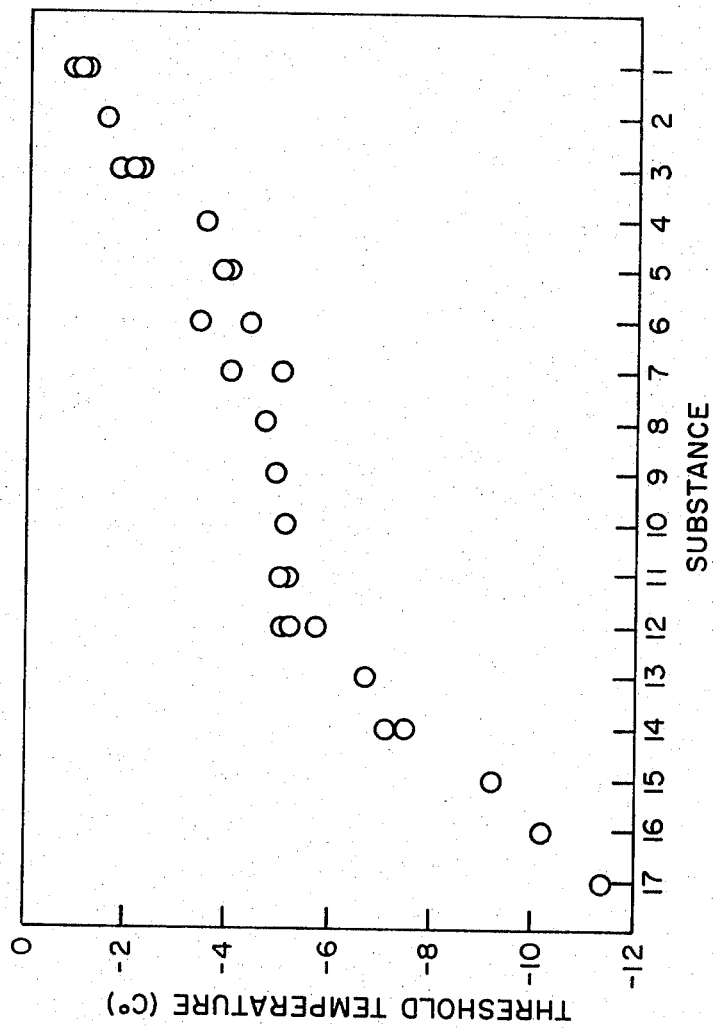

FIG. 2 represents the threshold temperatures in °C for various substances. The numbers correspond to the numbers of samples in Table 1.

The efficiency curves of samples 1 and 3 in FIG. 1 are particularly steep, demonstrating that the freezing nucleation catalyzed by these samples occurs within a narrow range of temperature in a large number of droplets. It should also be emphasized that these test results are more readily quantified compared to cloud chamber tests which were also performed.

Four substantially different types of nucleants are represented in Table 1 and in FIG. 2, namely, silver iodide, crystalline non-porous ion exchanged micas, the amorphous surface-hydroxylated silicas, and porous silicates represented by the zeolite. The mechanism of freezing nucleation on silver iodide has recently been discussed by Vonnegut and Chessin, Science, 174, 945 (1971) who found strong support for epitaxial induction of ice crystal growth on the isostructural silver iodide by improving the match between the two lattices and the nucleation ability through substitution of some of the iodide atoms of silver iodide by bromine. Early findings in this laboratory, A. C. Zettlemoyer, N. Tcheurekdjian and J. J. Chessick, Nature, 192, 653 (1961); Zettlemoyer, Tcheurekdjian and Hosler, Z. Angew. Math. Phys. 14, 496 (1963) and Tcheurekdjian, Zettlemoyer and Chessick, J. Phys. Chem. 58, 313 (1954) that silver iodide owed its ice nucleating ability to hydrophilic sites located in a hydrophobic matrix are not necessarily in disagreement with this epitaxial mechanism. A good nucleating preparation of silver iodide may possess both hydrophilic starting centers for growth of prenucleation clusters and a structure which catalyzes the conversion of the prenucleation embryos to ice crystals. The structural match, however, is not essential for nucleation since the amorphous wet-precipitated silicas have been found good, although not excellent catalysts for ice nucleation. The activity of the silicas could be controlled by the degree of surface hydroxylation to achieve a maximum efficiency of partially dehydroxylated silicas. Bassett, Boucher, Zettlemoyer, J. Coll. Interface Sci. 34, 436 (1970); Klier, Shen, Zettlemoyer, J. Phys. Chem. 77, 1458 (1973).

Although the partially dehydroxylated silicas such as samples 5, 6 and 11 have not been found to be quite as efficient as silver iodide, they are certainly cheaper, more stable to sunlight and ecologically safe.

The fluorine micas combine the beneficial properties of the silicas with the structural features of silver iodide. Although the hexagonal basal plane (001) of mica has lattice constants $a$ and $b$ about 11-17 percent larger than those of the (001) plane of ice, epitaxial growth of ice on mica has been observed by Caslavsky and Vedam, J. Applied Physics, 42, 516 (1971). In order to sustain the mismatch at temperatures close to the melting point of ice, the nucleating surface must possess active centers that bind the water molecules with a suitable energy. The existence and properties of these active centers are no less important than is the similarity in structures, and the fluorine micas appear to have such centers. The most exposed polar sites are the surface $K^+$ ions, Pauling, Structure of the Micas and Related Minerals, Proc. Nat. Acad. Sci., Vol. 16, 123 (1930); Deer, Howie and Zussman, Rock-Forming Minerals, Vol. 3, 46 (Wiley 1962) on which the water molecules are likely to be bound through the oxygen. Another possible center of adsorption is the surface cation vacancy, that is, a hexagonal oxygen window with the fluorine atoms placed 0.2133 nm below the plane of the oxygen atoms at the axis perpendicular to the (001) plane. The fluorine atoms could accommodate the water molecules by acting as acceptors of the hydrogen bond. The relative importance of the different active centers in ice nucleation can be assessed by the comparison of the threshold freezing temperatures of the fluorine mica, $-1°$ C for Sample 1, and hydroxyl mica, $-5.1$ for Sample 10.

These two types of mica have structurally identical (001) planes, and both have potassium ions on the surface. The surface cation vacancies, however, have adjacent fluorine atoms in the first case and hydroxyl groups in the second case. The better nucleation abilities of the fluorine micas suggest that the hydrogen bonding of the water molecules to the fluorine atoms is the necessary force sustaining the epitaxial mismatch between the growing ice crystals and the mica surface at temperatures close to 0°C. Finally, exchange of the potassium ion for higher-valent ions such as the aluminum ion in Samples 4, 7 and 8, and the cobalt ion in Sample 9, generally resulted in lowering of the nucleation ability of the fluorophlogopites. This phenomenon is likely to be caused by the tendency of the higher valent ions to form surface hydrates which are bulky and do not fit into the ice structure.

One theory of the surface action is as follows. The fluorine atoms placed in the centers of the oxygen 6-rings in the (001) plane of the micas are active centers for the acceptor hydrogen bond from water, and therefore act as anchoring sites for water. Around these anchoring sites develops a water cluster which is transformed into ice crystallite through epitaxial match on ice with the mica structure. Since the epitaxial match is not complete (the ice lattice has to expand some 11 to 17 percent depending on the type of mica) the anchoring sites at the fluorine atoms play an essential role in sustaining the expanded ice lattice. The pure fluorophlogopite mica has a formula of $K_2 Mg_6 Al_2 Si_6 O_{20} F_4$, free from impurities such as hydrolyzable ions, water, organic matter and carbon. On the other hand, fluorine atoms may be partially replaced by hydroxyl groups to form a composition $K_2 Mg_6 Al_2 Si_6 O_{20} F_{4-x} (OH)_x$, where $x$ has a value of 0 to 2 at the accessible surfaces. With gradual increase of $x$, the nucleation ability gradually decreases and the preferred value of $x$ is 0.

It may be emphasized, however, that the surface composition and not the bulk composition is essential for ice nucleation activity. Although the bulk composition may correspond to $x=0$ for some synthetic or natural micas, the surface composition is sensitive to environment. For example, washing or mere standing in water at room temperature for several days by the fluorophlogopite mica causes some surface fluorine atoms to be replaced by hydroxyl groups and the nucleation process is retarded. This poisoning effect is enhanced by the presence of hydrolyzable cations in the surface. On the other hand, contact of any synthetic or natural hydroxyl mica (that is a mica containing no fluorine but hydroxyl groups instead, such as muscovite or phlogopite) with highly concentrated fluorine solutions at a temperature of 0° to 100°C or with solid fluorides such as potassium, magnesium, or ammonium fluoride at temperatures of 450° to 600°C causes the surface to be enriched by fluorine and thereby increases the nucleating activity.

Synthetic fluorophlogopite may be made according to Bulletin 647, U.S. Department of Interior, Bureau of Mines, Shell and Ivey, Fluorine Micas. The raw materials may be heated to 700° – 800°C and then cooled if micro-crystalline fluorine mica is desired, or heated to 1,000° to 1,200°C with the same materials if larger crystals are desired.

The raw materials for fluorophlogopite mica may be for example any of the following:

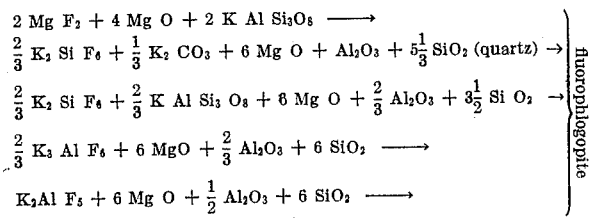

$$\left.\begin{array}{l} 2\,MgF_2 + 4\,MgO + 2\,KAlSi_3O_8 \longrightarrow \\ \frac{2}{3}\,K_2SiF_6 + \frac{1}{3}\,K_2CO_3 + 6\,MgO + Al_2O_3 + 5\tfrac{1}{3}\,SiO_2\ (\text{quartz}) \rightarrow \\ \frac{2}{3}\,K_2SiF_6 + \frac{2}{3}\,KAlSi_3O_8 + 6\,MgO + \frac{2}{3}\,Al_2O_3 + 3\tfrac{1}{2}\,SiO_2 \rightarrow \\ \frac{2}{3}\,K_3AlF_6 + 6\,MgO + \frac{2}{3}\,Al_2O_3 + 6\,SiO_2 \longrightarrow \\ K_2AlF_5 + 6\,MgO + \frac{1}{2}\,Al_2O_3 + 6\,SiO_2 \longrightarrow \end{array}\right\}\text{fluorophlogopite}$$

There is a dependence of nucleating activity on particle size; the decreased particle size has increased nucleating ability and therefore as small particles as possible should be used. This may be achieved by grinding to at least 1 micrometer or by synthetic methods well known in the art which impose no limit on the smallness of the particles. For example, it is possible to achieve 15 nm diameter to advantage.

One way of dispersing the fluorine micas is to use pyrotechnic flares to achieve dispersal in clouds. No deterioration of the micas occurs in the flares. The fluorine mica particles take the form of platelets which are of larger diameter relative to the thickness and the crystals are formed naturally in the form of platelets either in micro-crystalline or macro-crystalline form.

In view of our invention and disclosure, variations and modifications to meet individual whim or particular need will doubtless become evident to others skilled in the art to obtain all or part of the benefits of our invention without copying the process and substance shown, and we, therefore, claim all such insofar as they fall within the reasonable spirit and scope of our claims.

Having thus described our invention what we claim as new and desire to secure by Letters Patent is:

1. A process of nucleating crystallization of a hydrogen-bonding ice crystal from a cloud or vapor medium, which comprises seeding the medium until crystals form by particles in a size range of from 0.01 and 10 micrometers comprising a synthetic fluorophlogopite mica having a composition at the surface of $K_2Mg_6Al_2Si_6O_{20}F_{4-x}(OH)_x$, where $x$ is a number between 0 and 2.

2. A process according to claim 1, in which $x$ is O.

* * * * *